(12) United States Patent
Imoto

(10) Patent No.: US 8,618,198 B2
(45) Date of Patent: Dec. 31, 2013

(54) RUBBER COMPOSITION FOR SIDEWALL REINFORCING LAYER AND RUN-FLAT TIRE

(75) Inventor: Yoji Imoto, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 13/451,814

(22) Filed: Apr. 20, 2012

(65) Prior Publication Data

US 2012/0267024 A1   Oct. 25, 2012

(30) Foreign Application Priority Data

Apr. 21, 2011   (JP) .................... 2011-095260
Jan. 31, 2012   (JP) .................... 2012-018295

(51) Int. Cl.
*C08K 5/13*   (2006.01)
*B60C 17/00*   (2006.01)

(52) U.S. Cl.
USPC .................. 524/323; 152/516; 152/517

(58) Field of Classification Search
USPC .................. 524/323, 495; 152/516, 517
See application file for complete search history.

(56) References Cited

U.S. PATENT DOCUMENTS

| | | | | |
|---|---|---|---|---|
| 7,268,187 | B2* | 9/2007 | Miyazaki | 525/236 |
| 2002/0091184 | A1 | 7/2002 | Ikeda | |
| 2010/0132866 | A1* | 6/2010 | Imoto | 152/517 |

FOREIGN PATENT DOCUMENTS

| | | | |
|---|---|---|---|
| JP | 2002-155169 A | | 5/2002 |
| JP | 2009155631 A | * | 7/2009 |
| JP | 2010-168540 A | | 8/2010 |
| JP | 2012-116982 A | | 6/2012 |
| WO | WO 2009/084285 A1 | | 7/2009 |

OTHER PUBLICATIONS

JP 2009155631A (2009), machine translation, JPO Advanced Industrial Property Network (AIPN).*
JP 2009-155631 A (2009), machine translation, JPO Advanced Industrial Property Network (AIPN).*

* cited by examiner

*Primary Examiner* — David W Wu
*Assistant Examiner* — Josephine Chang
(74) *Attorney, Agent, or Firm* — Birch, Stewart, Kolasch & Birch, LLP

(57) ABSTRACT

A rubber composition for a sidewall reinforcing layer and a run-flat tire reduces heat build-up, enhances elongation at break at high temperature, and increases run-flat durability, while maintaining good rigidity. The composition contains a rubber component including tin-modified BR (a) and/or BR (b) modified by a compound of formula (1)

$$R^1-\underset{\underset{R^3}{|}}{\overset{\overset{R^2}{|}}{Si}}-(CH_2)_n-N\overset{R^4}{\underset{R^5}{\diagdown}} \quad (1)$$

wherein $R^1$, $R^2$, and $R^3$ may be the same as or different from one another and each represent an alkyl group, an alkoxy group, a silyloxy group, an acetal group, a carboxyl group, a mercapto group, or a derivative thereof; $R^4$ and $R^5$ may be the same as or different from each other and each represent a hydrogen atom or an alkyl group; and n denotes an integer; and an alkylphenol-sulfur chloride condensate, wherein an amount of the alkylphenol-sulfur chloride condensate is 3-10 parts by mass per 100 parts by mass of the rubber component.

7 Claims, No Drawings

RUBBER COMPOSITION FOR SIDEWALL REINFORCING LAYER AND RUN-FLAT TIRE

TECHNICAL FIELD

The present invention relates to a rubber composition for a sidewall reinforcing layer, and a run-flat tire using the rubber composition.

BACKGROUND ART

Currently, run-flat tires that have a high-strength sidewall reinforcing layer (insert) arranged on the inner side of the sidewall portion have been developed for practical use, so that the vehicle can travel a certain distance even when air pressure is lost due to a puncture (zero internal pressure). Therefore, it is no longer necessary to always carry a spare tire, which should allow a reduction in the weight of the overall vehicle. However, the running speed and the distance that the vehicle can travel on a puncture are limited, so that there is a need for further improvement in the durability of run-flat tires.

An example of a method for improving durability of a run-flat tire is to prevent the tire from breaking apart by making the reinforcing layer thicker in order to suppress deformation. However, since this increases the tire weight, such a method goes against the original objective of a run-flat tire, which is to reduce weight.

Another method is to suppress deformation by increasing the hardness of the reinforcing layer by increasing the amount of a reinforcing filler such as carbon black. However, this increases the load on a kneading machine during steps such as kneading and extrusion, and also increases heat build-up in terms of the post-vulcanization physical properties. Consequently, this method cannot be expected to provide much of an increase in run-flat durability, and also suffers from the problem that fuel economy deteriorates. Further, to improve run-flat durability, it is also important to improve the breaking properties (e.g. elongation at break) at high temperature.

Patent Document 1 considers adding sulfur and two or more vulcanization accelerators at predetermined amounts. However, the rubber composition shows a small elongation at high temperature, and therefore reduced tensile strength. Consequently, there is still a need for further improvement in reducing heat build-up, and enhancing elongation at break at high temperature, and increasing run-flat durability, while good rigidity is maintained. In addition, there is also a need to resolve problems such as reduced processability and storage stability.

Patent Document 1: JP 2002-155169 A

SUMMARY OF THE INVENTION

It is an object of the present invention to resolve the above-described problems, and to provide a rubber composition for a sidewall reinforcing layer and a run-flat tire which reduce heat build-up, and enhance elongation at break at high temperature, and increase run-flat durability, while good rigidity is maintained.

The present invention relates to a rubber composition for a sidewall reinforcing layer, comprising: a rubber component containing a tin-modified butadiene rubber (a) and/or a butadiene rubber (b) modified by a compound represented by the following formula (1); and an alkylphenol-sulfur chloride condensate, wherein an amount of the alkylphenol-sulfur chloride condensate is 3 to 10 parts by mass per 100 parts by mass of the rubber component:

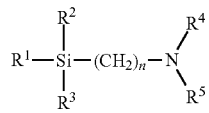

wherein $R^1$, $R^2$, and $R^3$ may be the same as or different from one another and each represent an alkyl group, an alkoxy group, a silyloxy group, an acetal group, a carboxyl group, a mercapto group, or a derivative thereof; $R^4$ and $R^5$ may be the same as or different from each other and each represent a hydrogen atom or an alkyl group; and n denotes an integer.

Preferably, the tin-modified butadiene rubber (a) is polymerized by a lithium initiator, and has a tin atom content of 50 to 3,000 ppm, a vinyl content of 5 to 50% by mass, and a molecular weight distribution of 2 or less.

The alkylphenol-sulfur chloride condensate is preferably a compound represented by the following formula (2):

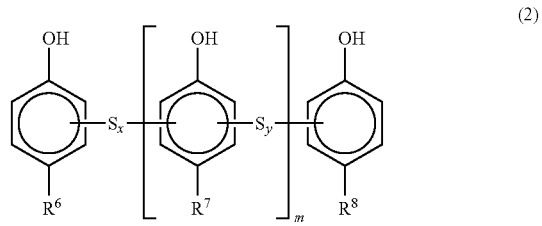

wherein $R^6$, $R^7$, and $R^8$ may be the same as or different from one another and each represent a C5-12 alkyl group; x and y may be the same as or different from each other and each denote an integer of 1 to 4; and m denotes an integer of 0 to 250.

Preferably, the rubber composition further comprises: a butadiene rubber (c) containing 2.5 to 20% by mass of a 1,2-syndiotactic polybutadiene crystal, wherein a total amount of (a) and (b) is 10 to 90% by mass, and an amount of (c) is 10 to 70% by mass, based on 100% by mass of the rubber component.

Preferably, the rubber composition further comprises: carbon black having a nitrogen adsorption specific surface area of 25 to 50 $m^2/g$, wherein an amount of the carbon black is 15 to 70 parts by mass per 100 parts by mass of the rubber component.

The present invention also relates to a run-flat tire, produced using the rubber composition.

The present invention provides a rubber composition for a sidewall reinforcing layer that contains specific modified butadiene rubbers (a) and/or (b) and a predetermined amount of an alkylphenol-sulfur chloride condensate. Accordingly, the present invention enables a reduction in heat build-up, an enhancement of the elongation at break at high temperature, and an increase in run-flat durability while maintaining good rigidity.

BEST MODE FOR CARRYING OUT THE INVENTION

The rubber composition for a sidewall reinforcing layer according to the present invention contains a rubber component including a tin-modified butadiene rubber (a) (tin-modified BR (a)) and/or a butadiene rubber (b) modified by a compound represented by the following formula (1) (S-modified BR (b)); and an alkylphenol-sulfur chloride condensate. Further, the amount of the alkylphenol-sulfur chloride condensate is 3 to 10 parts by mass per 100 parts by mass of the rubber component.

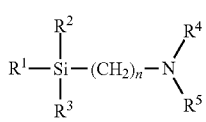
(1)

wherein $R^1$, $R^2$, and $R^3$ may be the same as or different from one another and each represent an alkyl group, an alkoxy group, a silyloxy group, an acetal group, a carboxyl group (—COOH), a mercapto group (—SH), or a derivative thereof; $R^4$ and $R^5$ may be the same as or different from each other and each represent a hydrogen atom or an alkyl group; and n denotes an integer.

Combining the above-described modified butadiene rubber (a) or (b) and the predetermined amount of the alkylphenol-sulfur chloride condensate reduces heat build-up, enhances elongation at break at high temperature, and significantly increases run-flat durability, and also provides excellent rigidity. In particular, the above combination enables a synergistic improvement in reducing heat build-up, enhancing elongation at break at high temperature, and increasing run-flat durability.

It is preferred that the tin-modified BR (a) is obtained by polymerizing 1,3-butadiene by a lithium initiator, and then adding a tin compound, so that the tin-modified BR molecule is terminated with a tin-carbon bond.

Examples of the lithium initiator include lithium compounds such as alkyllithium, aryllithium, allyllithium, vinyllithium, organotinlithium, and organonitrogenlithium compounds. By using a lithium compound as an initiator, a tin-modified BR with high vinyl content and low cis content can be produced.

Examples of the tin compound include tin tetrachloride, butyltin trichloride, dibutyltin dichloride, dioctyltin dichloride, tributyltin chloride, triphenyltin chloride, diphenyldibutyltin, triphenyltin ethoxide, diphenyldimethyltin, ditolyltin chloride, diphenyltin dioctanoate, divinyldiethyltin, tetrabenzyltin, dibutyltin distearate, tetraallyltin, p-tributyltin styrene and the like. One of these compounds may be used alone, or two or more may be used together.

The tin atom content in the tin-modified BR (a) is preferably 50 ppm or more, and more preferably 60 ppm or more. If the content is less than 50 ppm, the tans tends to increase. Further, the tin atom content is preferably 3,000 ppm or less, more preferably 2,500 ppm or less, and still more preferably 250 ppm or less. If the content exceeds 3,000 ppm, the extrusion processability of the kneaded mixture tends to deteriorate.

The molecular weight distribution (Mw/Mn) of the tin-modified BR (a) is preferably 2 or less, and more preferably 1.5 or less. If the Mw/Mn exceeds 2, the tan δ tends to increase. Although the lower limit of the molecular weight distribution is not particularly limited, the molecular weight distribution is preferably 1 or more.

As used herein, the weight average molecular weight (Mw) and the number average molecular weight (Mn) can be determined relative to polystyrene standards based on measurement values obtained by gel permeation chromatography (GPC) (GPC-8000 Series, produced by Tosoh Corporation; detector: differential refractometer; column: TSKgel Super-Multipore HZ-M, produced by Tosoh Corporation).

The vinyl content of the tin-modified BR (a) is preferably 5% by mass or more, and more preferably 7% by mass or more. If the content is less than 5% by mass, it is difficult to produce the tin-modified BR. The vinyl content is preferably 50% by mass or less, and more preferably 20% by mass or less. If the content exceeds 50% by mass, the carbon black dispersibility and the tensile strength tend to deteriorate.

The vinyl content can be measured based on infrared absorption spectrum analysis.

Examples of the above-described S-modified BR (b) include the rubbers described in JP 2010-37436 A and JP 2010-84059 A. Further, examples of the above-described compound represented by formula (1) include the compounds described in JP 2010-111753 A and JP 2010-111754 A.

In formula (1), $R^1$, $R^2$, and $R^3$ are each preferably an alkoxy group (preferably a C1-8 alkoxy group, more preferably a C1-6 alkoxy group, and still more preferably a C1-4 alkoxy group). $R^4$ and $R^5$ are each preferably an alkyl group (preferably a C1-4 alkyl group). Preferably n denotes an integer of 1 to 5, more preferably 2 to 4, and still more preferably 3. By using such a preferred compound, good effects in terms of reducing heat build-up and increasing run-flat durability can be achieved.

Specific examples of the compound represented by formula (1) include 2-dimethylaminoethyltrimethoxysilane, 3-dimethylaminopropyltrimethoxysilane, 2-dimethylaminoethyltriethoxysilane, 3-dimethylaminopropyltriethoxysilane, 2-diethylaminoethyltrimethoxysilane, 3-diethylaminopropyltrimethoxysilane, 2-diethylaminoethyltriethoxysilane, 3-diethylaminopropyltriethoxysilane and the like. Among these, from the perspectives of a comparatively low cost and excellent thermal stability, 3-diethylaminopropyltrimethoxysilane is preferred. One type of these compounds may be used alone, or two or more types may be used together.

Examples of the method for modifying butadiene rubber with the compound represented by formula (1) include conventionally-known methods, such as the methods described in JP H6-53768 B and JP H6-57767 B. For example, this modification may be carried out by bringing butadiene rubber into contact with the compound, and examples of the method therefor include a method in which butadiene rubber is synthesized by anionic polymerization, then a predetermined amount of the compound is added to the polymerized rubber solution so that the polymerizing end (active end) of the butadiene rubber is reacted with the compound.

The vinyl content of the S-modified BR (b) is preferably 35% by mass or less, more preferably 25% by mass or less, and still more preferably 20% by mass or less. If the vinyl content is more than 35% by mass, the effect of reducing heat build-up tends to decrease. Although the lower limit of the vinyl content is not particularly limited, the vinyl content is preferably 3% by mass or more, and more preferably 7% by mass or more.

As used herein, the vinyl content (1,2-butadiene unit content) can be measured based on infrared absorption spectrum analysis.

The amount of the tin-modified BR (a) based on 100% by mass of the rubber component is preferably 10% by mass or more, and more preferably 20% by mass or more. If the amount is less than 10% by mass, the effect of reducing heat build-up tends not to be sufficiently exhibited. The amount is preferably 90% by mass or less, and more preferably 70% by mass or less. If the amount is more than 90% by mass, the elongation at break at high temperature tends to deteriorate.

The amount of the S-modified BR (b) based on 100% by mass of the rubber component is preferably 10% by mass or more, and more preferably 20% by mass or more. If the amount is less than 10% by mass, the effect of reducing heat build-up tends not to be sufficiently exhibited. The amount is preferably 90% by mass or less, and more preferably 70% by mass or less. If the amount is more than 90% by mass, the elongation at break at high temperature tends to deteriorate.

The total amount of (a) and (b) based on 100% by mass of the rubber component is, from the perspective of less heat build-up, preferably 10% by mass or more, and more preferably 30% by mass or more. In terms of elongation at break at high temperature, the total amount is preferably 90% by mass or less, and more preferably 80% by mass or less.

It is preferred that the rubber composition according to the present invention contains a butadiene rubber (c) (SPB-containing BR (C)) containing 2.5 to 20% by mass of a 1,2-syndiotactic polybutadiene crystal (SPB). This enables far superior rigidity, elongation at break at high temperature, and run-flat durability to be achieved, while reducing heat build-up.

Although a product that is generally used in the tire industry may be used for the SPB-containing BR (c), it is preferred that the 1,2-syndiotactic polybutadiene crystals are chemically bonded with BR and dispersed, from the perspective of providing the above-described properties at good levels.

The melting point of the 1,2-syndiotactic polybutadiene crystal is preferably 180° C. or more, and more preferably 190° C. or more, but preferably 220° C. or less, and more preferably 210° C. or less. Below the lower limit, the crystal breaks down, which may prevent the above-described properties from being achieved. Above the upper limit, processability tends to deteriorate.

In the SPB-containing BR (c), the content of the 1,2-syndiotactic polybutadiene crystal is preferably 2.5% by mass or more, and more preferably 10% by mass or more. If the content is less than 2.5% by mass, sufficient rigidity may not be achieved. The content is preferably 20% by mass or less, and more preferably 18% by mass or less. If the content is more than 20% by mass, processability tends to deteriorate.

The amount of the SPB-containing BR (c) based on 100% by mass of the rubber component is preferably 10% by mass or more, and more preferably 20% by mass or more. If the amount is less than 10% by mass, the improvement effects which should be achieved by adding this BR tend not to be sufficiently exhibited. The amount is preferably 70% by mass or less, and more preferably 40% by mass or less. If the amount exceeds 70% by mass, the effect of reducing heat build-up tends not to be sufficiently achieved.

Examples of usable rubbers other than (a) to (c) which may be contained in the rubber component of the rubber composition according to the present invention include diene rubbers such as natural rubber (NR), epoxidized natural rubber (ENR), styrene-butadiene rubber (SBR), isoprene rubber (IR), ethylene-propylene-diene rubber (EPDM), butyl rubber (IIR), halogenated butyl rubber (X-IIR), and chloroprene rubber (CR). Of these, NR and IR are preferred from the perspective that a good balance can be achieved among higher rigidity, less heat build-up, better elongation at break at high temperature, and higher run-flat durability.

The NR is not particularly limited. For example, a natural rubber that is usually used in the tire industry may be used, such as SIR20, RSS #3, and TSR20. As the IR, an isoprene rubber that is well known in the tire industry, for example, may be used.

The amount of a diene rubber other than (a) to (c) based on 100% by mass of the rubber component is preferably 0 to 80% by mass. Especially when the rubber composition contains NR and IR, the total amount of NR and IR based on 100% by mass of the rubber component is, from the perspective of providing a good balance among the above-described properties, preferably 10% by mass or more, and more preferably 20% by mass or more, but preferably 70% by mass or less, and more preferably 40% by mass or less.

The rubber composition according to the present invention typically contains carbon black. The nitrogen adsorption specific surface area ($N_2SA$) of carbon black is preferably 25 $m^2/g$ or more, and more preferably 40 $m^2/g$ or more. If the $N_2SA$ is less than 25 $m^2/g$, sufficient reinforcement tends not to be achieved. The $N_2SA$ is preferably 50 $m^2/g$ or less, and more preferably 45 $m^2/g$ or less. If the $N_2SA$ exceeds 50 $m^2/g$, processability tends to deteriorate.

Here, the $N_2SA$ of carbon black can be determined based on JIS K 6217-2: 2001.

The amount of carbon black is preferably 15 parts by mass or more, and more preferably 40 parts by mass or more, per 100 parts by mass of the rubber component. If the amount is less than 15 parts by mass, sufficient reinforcement tends not to be achieved. The amount is preferably 70 parts by mass or less, and more preferably 60 parts by mass or less, per 100 parts by mass of the rubber component. If the amount exceeds 70 parts by mass, the effect of reducing heat build-up tends to decrease.

The rubber composition according to the present invention contains a predetermined amount of an alkylphenol-sulfur chloride condensate. Although this alkylphenol-sulfur chloride condensate is not particularly limited, a compound represented by the following formula (2) is preferred in terms of favorably reducing heat build-up, and favorably improving elongation at break at high temperature, run-flat durability, and rigidity:

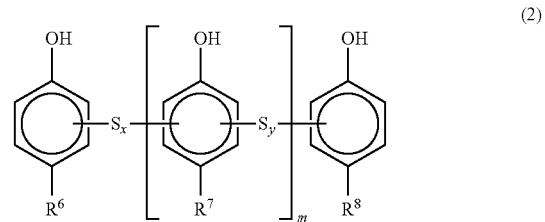

(2)

wherein $R^6$, $R^7$, and $R^8$ may be the same as or different from one another and each represent a C5-12 alkyl group; x and y may be the same as or different from each other, and each denote an integer of 1 to 4; and m denotes an integer of 0 to 250.

From the perspective of good dispersibility of the alkylphenol-sulfur chloride condensate in the rubber component, m preferably denotes an integer of 0 to 100. From the perspective of efficiently achieving high hardness, x and y are each preferably an integer of 2 to 4, and are more preferably both 2. From the perspective of good dispersibility of the alkylphenol-sulfur chloride condensate in the rubber component, $R^6$ to $R^6$ are each preferably a C6-9 alkyl group.

The alkylphenol-sulfur chloride condensate can be prepared by a known method. For example, an alkylphenol and a sulfur chloride may be reacted at a molar ratio of 1:0.9-1.25 for instance. Specific examples of the alkylphenol-sulfur chloride condensate include Tackirol V200 (following formula (3)) produced by Taoka Chemical Co., Ltd.:

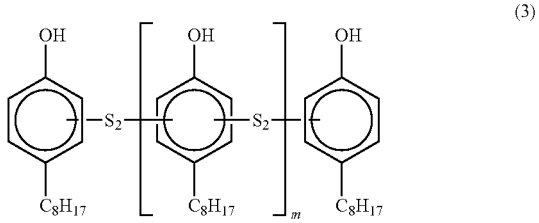

(3)

wherein m denotes an integer of 0 to 100.

The amount of the alkylphenol-sulfur chloride condensate is 3 parts by mass or more, and preferably 4 parts by mass or more, per 100 parts by mass of the rubber component. If the amount is less than 3 parts by mass, a sufficient improvement in reducing heat build-up and increasing run-flat durability may not be achieved. The amount is 10 parts by mass or less, and preferably 8 parts by mass or less, per 100 parts by mass of the rubber component. If the amount exceeds 10 parts by mass, a sufficient improvement in elongation at break at high temperature and run-flat durability may not be achieved.

In addition to the above-described ingredients, the rubber composition according to the present invention may appropriately contain other additives usually used to produce rubber compositions, such as zinc oxide, stearic acid, oils, various antioxidants, waxes, vulcanizing agents such as sulfur, and vulcanization accelerators.

In the rubber composition according to the present invention, the amount of stearic acid is preferably 2.5 parts by mass or more, and more preferably 2.8 parts by mass or more, per 100 parts by mass of the rubber component. The amount is preferably 5 parts by mass or less, and more preferably 4 parts by mass or less. If the amount is within this range, the advantageous effects of the present invention can be exerted.

Meanwhile, the amount of zinc oxide is preferably 3.5 parts by mass or more, and more preferably 5 parts by mass or more, per 100 parts by mass of the rubber component. The amount is preferably 10 parts by mass or less, and more preferably 8 parts by mass or less. If the amount is within this range, the advantageous effects of the present invention can be exerted.

The rubber composition according to the present invention typically contains sulfur. From the perspectives of excellent run-flat durability and handling stability, the amount of sulfur is preferably 2.5 parts by mass or more, and more preferably 4 parts by mass or more, per 100 parts by mass of the rubber component. From the perspective of preventing blooming, the amount is preferably 10 parts by mass or less, and more preferably 6 parts by mass or less. Here, the amount of sulfur refers to the amount of pure sulfur. This is the amount of pure sulfur excluding oil if insoluble sulfur is used.

The rubber composition according to the present invention is produced by a usual method. More specifically, the respective components are kneaded with a Banbury mixer, a kneader, an open roll mill or the like, and then vulcanized, whereby a rubber composition can be produced.

The rubber composition according to the present invention is used for a reinforcing rubber layer (sidewall reinforcing layer) in the sidewall portion of a run-flat tire. Due to the presence of the reinforcing rubber layer, the tire can support the weight of the vehicle even when air pressure is lost, so that excellent run-flat durability can be conferred. The "reinforcing rubber layer in the sidewall portion" refers to a lining strip layer that is arranged on the inner side of the sidewall portion of a run-flat tire. Specifically, the inventive rubber composition may be used for, for example, the reinforcing rubber layer illustrated in the drawings of JP 2004-330822 A (the crescent-shaped reinforcing rubber layer whose thickness tapers off in both end directions, that is arranged from the bead portion to the shoulder portion on the inner side of the carcass ply).

The run-flat tire according to the present invention can be produced by a usual method using the above-described rubber composition. Specifically, the run-flat tire can be produced by extruding and processing the above-described rubber composition when it is still not vulcanized to match the shape of a reinforcing layer of the sidewall portion, molding the resultant rubber composition by a usual method on a tire building machine, assembling the resultant component with other tire components to form an unvulcanized tire, and subjecting the unvulcanized tire to heat and pressure in a vulcanizer.

EXAMPLES

The present invention will now be described in more detail based on the following examples. However, the present invention is not limited to only the examples.

NR: RSS #3

IR: IR 2200 (isoprene rubber produced by JSR Corporation)

SPB-containing BR: VCR 617 produced by Ube Industries Ltd. (1,2-syndiotactic polybutadiene crystal dispersion, 1,2-syndiotactic polybutadiene crystal content: 17% by mass, 1,2-syndiotactic polybutadiene crystal melting point: 200° C., boiling n-hexane insolubles content: 15 to 18% by mass)

Tin-modified BR: BR 1250H produced by Zeon Corporation (lithium used as polymerization initiator, vinyl content: 10 to 13% by mass, Mw/Mn: 1.5, tin atom content: 250 ppm)

S-modified BR: Modified butadiene rubber produced by Sumitomo Chemical Co., Ltd. (vinyl content: 15% by mass; $R^1$, $R^2$, $R^3$=—$OCH_3$; $R^4$, $R^5$=—$CH_2CH_3$; n=3)

BR: BR 150B produced by Ube Industries Ltd. (high-cis BR)

Carbon black: SHOBLACK N550 produced by Cabot Japan K.K. ($N_2SA$: 42 m$^2$/g)

Antioxidant: Nocrac 6C produced by Ouchi Shinko Chemical Industrial Co., Ltd. (N-(1,3-dimethylbutyl)-N'-phenyl-p-phenylenediamine)

Wax: Sunnoc wax produced by Ouchi Shinko Chemical Industrial Co., Ltd.

Aromatic oil: Diana Process AH-24 produced by Idemitsu Kosan Co., Ltd.

Stearic acid: Stearic acid produced by NOF Corporation

Zinc oxide: Zinc oxide #1 produced by Mitsui Mining & Smelting Co., Ltd.

Insoluble sulfur: Seimi sulfur produced by Nippon Kanryu Industry Co., Ltd. (insoluble sulfur containing 60% or more of matter insoluble in carbon disulfide, oil content: 10% by mass)

Vulcanization accelerator NS: Nocceler NS produced by Ouchi Shinko Chemical Industrial Co., Ltd. (N-tert-butyl-2-benzothiazolylsulfenamide)

V200: Tackirol V200 produced by Taoka Chemical Co., Ltd. (alkylphenol-sulfur chloride condensate represented by the above formula (3), sulfur content: 24% by mass)

Examples and Comparative Examples

Based on the formulations shown in Table 1, the chemicals other than the sulfur, vulcanization accelerator, and V200 were mixed and kneaded for 5 minutes at 150° C. using a Banbury mixer to give a kneaded mixture. Next, the sulfur, vulcanization accelerator, and V200 were added to the kneaded mixture. The resultant mixture was then mixed and kneaded for 5 minutes at 80° C. using an open two-roll mill to produce an unvulcanized rubber composition.

A portion of the produced unvulcanized rubber composition was press-vulcanized for 30 minutes at 150° C. to produce a vulcanized rubber sheet (vulcanized rubber composition).

In addition, another portion of the produced unvulcanized rubber composition was molded into the shape of a reinforcing layer of the sidewall portion, assembled with other tire components, and vulcanized for 12 minutes at 170° C. and 25 kgf to produce a test run-flat tire (tire size: 195/65 R15).

The produced vulcanized rubber sheets and test tires were subjected to the following evaluations. Table 1 shows the results.

(Tensile Test)

The elongation at break (EB) was measured by carrying out a tensile test at a temperature of 150° C. based on JIS K 6251 "Rubber, vulcanized or thermoplastic—Determination of tensile stress-strain properties" using a No. 3 dumbbell-shaped test piece formed from the vulcanized rubber composition. Based on a value for Comparative Example 1 regarded as 100, the EB for each formulation is displayed as an index according to the following equation. Here, the larger the EB index, the better the EB, indicating excellent tensile strength at high temperature.

(EB index)=(EB for each formulation)/(EB for Comparative Example 1)×100

(Viscoelasticity Test)

The complex elastic modulus (E*) and the loss tangent (tan δ) were measured using a viscoelasticity spectrometer VES (produced by Iwamoto Seisakusho Co., Ltd.) at a measurement temperature of 70° C., an initial strain of 10%, a dynamic strain of ±2%, and a frequency of 10 Hz. Based on a value for Comparative Example 1 regarded as 100, the E* and tan δ for each formulation are displayed as an index. Here, the larger the E* index, the higher the rigidity, indicating excellent handling stability. The smaller the tan δ index, the less the heat build-up.

(Machine Durability Test (Run-Flat Durability))

The test run-flat tire that had been left for 1 week in an oven at 80° C. was run under an internal pressure of 200 kPa and a load of 340 kgf (3334.261 N) at a speed of 80 km/h. Without topping up the air pressure during running, the running distance until air started to leak from the tire was determined. Air leak was considered to occur when the internal pressure in the tire reached 95% (190 kPa) of the initial pressure by measurement with a detection limit of 5 kPa or less. As the internal pressure in the tire decreases, the durability of the tire decreases. Based on a value for Comparative Example 1 regarded as 100, the running distance until the occurrence of air leak for each formulation is displayed as a run-flat durability index according to the following equation. Here, the larger the run-flat durability index, the better the durability of the sidewall reinforcing layer.

Run-flat durability index=(Running distance for each formulation)/(Running distance for Comparative Example 1)×100

TABLE 1

| | | Examples | | | | | | Comparative Examples | | | | | |
|---|---|---|---|---|---|---|---|---|---|---|---|---|---|
| | | 1 | 2 | 3 | 4 | 5 | 6 | 1 | 2 | 3 | 4 | 5 | 6 |
| Formulation (part(s) by mass) | NR or IR | 30 | 30 | 30 | 30 | 30 | 30 | 30 | 30 | 30 | 30 | 30 | 30 |
| | SPB-containing BR | — | 30 | 30 | — | 30 | 30 | — | — | — | — | — | — |
| | Tin-modified BR | 70 | 40 | 40 | — | — | — | — | — | 70 | 70 | — | — |
| | S-modified BR | — | — | — | 70 | 40 | 40 | — | — | — | — | 70 | 70 |
| | BR | — | — | — | — | — | — | 70 | 70 | — | — | — | — |
| | Carbon black | 50 | 50 | 50 | 50 | 50 | 50 | 50 | 50 | 50 | 50 | 50 | 50 |
| | Antioxidant | 1.5 | 1.5 | 1.5 | 1.5 | 1.5 | 1.5 | 1.5 | 1.5 | 1.5 | 1.5 | 1.5 | 1.5 |
| | Wax | 1 | 1 | 1 | 1 | 1 | 1 | 1 | 1 | 1 | 1 | 1 | 1 |
| | Aromatic oil | 5 | 5 | 5 | 5 | 5 | 5 | 5 | 5 | 5 | 5 | 5 | 5 |
| | Stearic acid | 3 | 3 | 3 | 3 | 3 | 3 | 3 | 3 | 3 | 3 | 3 | 3 |
| | Zinc oxide | 6 | 6 | 6 | 6 | 6 | 6 | 6 | 6 | 6 | 6 | 6 | 6 |
| | Insoluble sulfur | 5 | 5 | 5 | 5 | 5 | 5 | 5 | 5 | 5 | 5 | 5 | 5 |
| | (sulfur content) | (4.5) | (4.5) | (4.5) | (4.5) | (4.5) | (4.5) | (4.5) | (4.5) | (4.5) | (4.5) | (4.5) | (4.5) |
| | Vulcanization accelerator NS | 2 | 2 | 2 | 2 | 2 | 2 | 2 | 2 | 2 | 2 | 2 | 2 |
| | V200 | 5 | 5 | 7 | 5 | 5 | 7 | 2 | 5 | 2 | 15 | 2 | 15 |
| Evaluation | EB index (150° C.) | 110 | 125 | 128 | 120 | 118 | 121 | 100 | 101 | 108 | 93 | 106 | 91 |
| | E* index (70° C.) | 100 | 108 | 109 | 98 | 108 | 109 | 100 | 102 | 100 | 107 | 100 | 107 |
| | Tan δ index (70° C.) | 76 | 80 | 76 | 78 | 81 | 79 | 100 | 97 | 85 | 86 | 86 | 88 |
| | Run-flat durability index | 115 | 121 | 130 | 110 | 120 | 123 | 100 | 102 | 98 | 98 | 99 | 97 |

Table 1 shows that in the Examples in which tin-modified BR or S-modified BR were used in combination with a predetermined amount of an alkylphenol-sulfur chloride condensate, less heat build-up, better elongation at break at high temperature, and higher run-flat durability were achieved while good rigidity was maintained. In particular, a synergistic effect was exerted in terms of reducing heat build-up, enhancing elongation at break at high temperature, and increasing run-flat durability. Further, if SPB-containing BR was added, a far superior improvement in rigidity, elongation at break at high temperature, and run-flat durability was obtained, while the heat build-up was reduced.

The invention claimed is:

1. A run-flat tire comprising a sidewall reinforcing layer formed from a rubber composition for a sidewall reinforcing layer, comprising:
   a rubber component containing a tin-modified butadiene rubber (a) and/or a butadiene rubber (b) modified by a compound represented by the following formula (1):

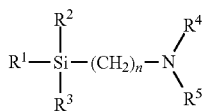

wherein $R^1$, $R^2$, and $R^3$ may be the same as or different from one another and each represent an alkyl group, an alkoxy group, a silyloxy group, an acetal group, a carboxyl group, a mercapto group, or a derivative thereof; $R^4$ and $R^5$ may be the same as or different from each other and each represent a hydrogen atom or an alkyl group; and n denotes an integer,
an alkylphenol-sulfur chloride condensate,
a stearic acid and
a zinc oxide,
wherein the amount of the alkylphenol-sulfur chloride condensate is 3 to 10 parts, the amount of the stearic acid is 2.5 to 5 parts and the amount of the zinc oxide is 5 to 10 parts by mass per 100 parts by mass of the rubber component.

2. The run-flat tire according to claim 1,
wherein the tin-modified butadiene rubber (a) is polymerized by a lithium initiator, and has a tin atom content of 50 to 3,000 ppm, a vinyl content of 5 to 50% by mass, and a molecular weight distribution of 2 or less, and
the alkylphenol-sulfur chloride condensate is a compound represented by the following formula (2):

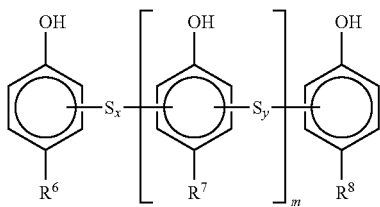

wherein $R^6$, $R^7$, and $R^8$ may be the same as or different from one another and each represent a $C_{5-12}$ alkyl group; x and y may be the same as or different from each other and each denote an integer of 1 to 4; and m denotes an integer of 0 to 250.

3. The run-flat tire according to claim 1, further comprising:
a butadiene rubber (c) containing 2.5 to 20% by mass of a 1,2-syndiotactic polybutadiene crystal,
wherein the total amount of (a) and (b) is 10 to 90% by mass, and the amount of (c) is 10 to 70% by mass, based on 100% by mass of the rubber component.

4. The run-flat tire according to claim 1, further comprising:
carbon black having a nitrogen adsorption specific surface area of 25 to 50 $m^2/g$,
wherein the amount of the carbon black is 15 to 70 parts by mass per 100 parts by mass of the rubber component.

5. The run-flat tire according to claim 1, wherein the amount of the alkylphenol-sulfur chloride condensate is 4 to 8 parts by mass per 100 parts by mass of the rubber component.

6. The run-flat tire according to claim 1, further comprising:
a natural rubber and/or an isoprene rubber,
wherein the total amount of the natural rubber and the isoprene rubber is 10 to 70% by mass, based on 100% by mass of the rubber component.

7. The run-flat tire according to claim 1, further comprising:
a sulfur,
wherein the amount of the sulfur is 2.5 to 10 parts by mass per 100 parts by mass of the rubber component.

* * * * *